(12) United States Patent
Jin et al.

(10) Patent No.: US 11,836,887 B2
(45) Date of Patent: Dec. 5, 2023

(54) VIDEO GENERATION METHOD AND APPARATUS, AND READABLE MEDIUM AND ELECTRONIC DEVICE

(71) Applicant: Beijing Bytedance Network Technology Co., Ltd., Beijing (CN)

(72) Inventors: Xiaojie Jin, Los Angeles, CA (US); Xiaohui Shen, Los Angeles, CA (US); Yan Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/091,087

(22) Filed: Dec. 29, 2022

(65) Prior Publication Data

US 2023/0153941 A1    May 18, 2023

Related U.S. Application Data

(63) Continuation of application No. PCT/CN2021/099107, filed on Jun. 9, 2021.

(30) Foreign Application Priority Data

Jul. 17, 2020  (CN) .......................... 202010694518.5

(51) Int. Cl.
*G06T 7/00*   (2017.01)
*G06T 3/40*   (2006.01)
(Continued)

(52) U.S. Cl.
CPC ............... *G06T 3/40* (2013.01); *G06T 7/194* (2017.01); *G06T 7/248* (2017.01); *G06T 7/536* (2017.01);
(Continued)

(58) Field of Classification Search
CPC . G06T 2207/10028; G06T 2207/20221; G06T 3/0093; G06T 3/40; G06T 7/194;
(Continued)

(56) References Cited

U.S. PATENT DOCUMENTS

| 10,757,319 B1* | 8/2020 | Luo ......................... H04N 23/62 |
| 2014/0240553 A1* | 8/2014 | Pylvanainen ........ H04N 5/2628 348/240.2 |

(Continued)

FOREIGN PATENT DOCUMENTS

| CN | 104980651 A | 10/2015 |
| CN | 109379537 A | 2/2019 |

(Continued)

OTHER PUBLICATIONS

International Search Report issued in International Patent Application No. PCT/CN2021/099107 dated Aug. 25, 2021.
(Continued)

*Primary Examiner* — Li Liu
(74) *Attorney, Agent, or Firm* — ARENTFOX SCHIFF LLP

(57) ABSTRACT

A video generation method includes: acquiring an original image corresponding to a target frame, and identifying a target object in the original image; according to a sliding zooming strategy, performing sliding zooming processing on an initial background image in the original image excluding the target object, so as to obtain a target background image, wherein the sliding zooming strategy is at least used for indicating a sliding direction and a zooming direction of the initial background image, and the sliding direction is opposite to the zooming direction; according to the position of the target object in the original image, superimposing an image of the target object onto the target background image to obtain a target image corresponding to the target frame;

(Continued)

and generating a target video on the basis of the target image corresponding to the target frame.

17 Claims, 3 Drawing Sheets

(51) Int. Cl.
*G06T 7/194* (2017.01)
*G06T 7/536* (2017.01)
*G06T 7/246* (2017.01)

(52) U.S. Cl.
CPC .............. *G06T 2207/10016* (2013.01); *G06T 2207/20164* (2013.01)

(58) Field of Classification Search
CPC ... G06T 2207/20112; G06T 7/11; G06T 7/55; H04N 23/69; H04N 5/2628; H04N 13/111; H04N 23/959; H04N 5/2621; G06V 20/04
See application file for complete search history.

(56) References Cited

U.S. PATENT DOCUMENTS

| | | | | |
|---|---|---|---|---|
| 2015/0286899 | A1* | 10/2015 | Nakayama | G06T 7/194 |
| | | | | 382/224 |
| 2015/0317520 | A1* | 11/2015 | Gurbuz | G06T 1/60 |
| | | | | 382/103 |
| 2021/0125307 | A1* | 4/2021 | Ranade | H04N 13/271 |

FOREIGN PATENT DOCUMENTS

| | | |
|---|---|---|
| CN | 110262737 A | 9/2019 |
| CN | 110363146 A | 10/2019 |
| CN | 111083380 A | 4/2020 |
| CN | 112532808 A | 3/2021 |
| JP | 2017143354 A | 8/2017 |

OTHER PUBLICATIONS

Supplementary Partial European Search Report issuing in EP21841214.6 dated Oct. 27, 2023.

* cited by examiner

VIDEO GENERATION METHOD AND APPARATUS, AND READABLE MEDIUM AND ELECTRONIC DEVICE

The present application is a continuation of International Application No. PCT/CN2021/099107, filed on Jun. 9, 2021 which claims priority of Chinese Patent Application No. 202010694518.5, titled "VIDEO GENERATION METHOD AND APPARATUS, AND READABLE MEDIUM AND ELECTRONIC DEVICE", filed with the China National Intellectual Property Administration on Jul. 17, 2020, both of which are incorporated herein by reference in their entireties.

FIELD

The present disclosure relates to the field of computer technology, and in particular, to a video generation method and apparatus, a readable medium and an electronic device.

BACKGROUND

Dolly zoom, also known as Hitchcock zoom, is a video shooting technique, which can change the visual perspective relationship to compress or enlarge a background space without changing an image subject, so as to take the sci-fi and cool image. In the conventional technology, if a video which is not shot in the Hitchcock zoom shooting technique is required to represent a Hitchcock zoom effect, the Hitchcock zoom effect may be achieved by manually performing post-processing on the shot video. The post-processing includes: manually locating a subject in a picture (for example, a person in the picture) based on a shot video segment, and then zooming key frames of a background other than the subject. But manual processing is very complex, time-consuming and inefficient.

SUMMARY

The section of the summary is provided to introduce a concept in a simplified form that is described in detail in the section of Detailed Description of the Embodiments that follows. The section of the summary is not intended to identify key features or essential features of the claimed technical solution, and is not intended to limit the scope of the claimed technical solution.

In a first aspect, a video generation method is provided according to the present disclosure. The method includes:
acquiring an original image corresponding to a target frame and identifying a target object in the original image;
performing dolly zoom processing on an initial background image in the original image other than the target object in a dolly zoom strategy, to obtain a target background image, wherein the dolly zoom strategy is at least used to indicate a dolly direction and a zoom direction for the initial background image, and the dolly direction is opposite to the zoom direction;
superimposing an image of the target object onto the target background image based on a position of the target object in the original image, to obtain a target image corresponding to the target frame; and
generating a target video based on the target image corresponding to the target frame.

In a second aspect, a video generation apparatus is provided according to the present disclosure. The apparatus includes:
a first acquisition module configured to acquire an original image corresponding to a target frame and identifying a target object in the original image;
a processing module configured to perform dolly zoom processing on an initial background image in the original image other than the target object in a dolly zoom strategy, to obtain a target background image, wherein the dolly zoom strategy is at least used to indicate a dolly direction and a zoom direction for the initial background image, and the dolly direction is opposite to the zoom direction;
a first generation module configured to superimpose an image of the target object onto the target background image based on a position of the target object in the original image, to obtain a target image corresponding to the target frame;
a second generation module configured to generate a target video based on the target image corresponding to the target frame.

In a third aspect, a computer readable medium storing a computer program thereon is provided according to the present disclosure. The program, when executed by a processing apparatus, performs steps of the video generation method according to the first aspect of the present disclosure.

In a fourth aspect, an electronic device is provided according to the present disclosure. The electronic device includes:
a storage apparatus storing a computer program thereon, and
a processing apparatus configured to execute the computer program stored in the storage apparatus to perform steps of the video generation method according to the first aspect of the present disclosure.

Through the above technical solution, an original image corresponding to a target frame is acquired and a target object in the original image is identified; dolly zoom processing is performed on an initial background image in the original image other than the target object in a dolly zoom strategy, to obtain a target background image; an image of the target object is superimposed onto the target background image based on a position of the target object in the original image, to obtain a target image corresponding to the target frame; and a target video is generated based on the target image corresponding to the target frame. Therefore, the dolly zoom effect can be automatically added to an image based on the image itself, to ensure that a picture subject of the image remains unchanged while the perspective relationship of a background is changed. In this way, a video with the subject unchanged and the background quickly compressed or enlarged, that is, the target video with the dolly zoom effect, can be generated based on a series of such images. Therefore, a video with the dolly zoom effect can be obtained without using specific shooting techniques or manual processing, and the data processing efficiency is high.

Other features and advantages of the present disclosure are described in detail in the section of Detailed Description of the Embodiments that follows.

DETAILED DESCRIPTION

Figure 1:
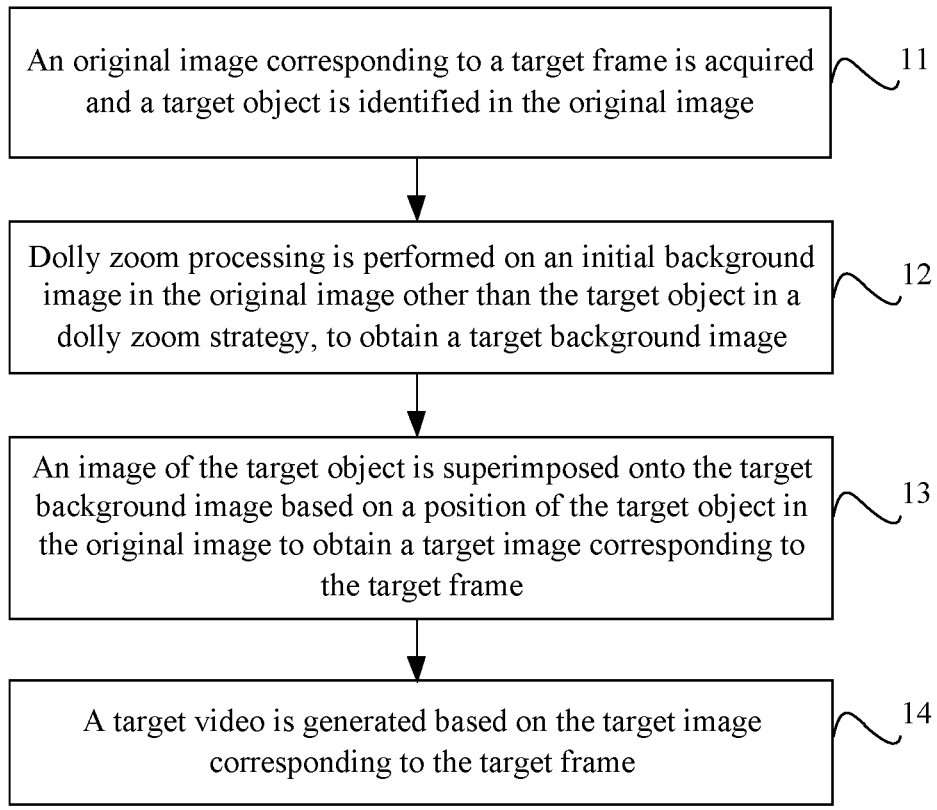
FIG. 1 is a flowchart of a video generation method according to an embodiment of the present disclosure.

The embodiments of the present disclosure are described in detail below with reference to the accompanying drawings. Although the drawings show some embodiments of the present disclosure, it should be understood that the present disclosure may be implemented in various forms and should not be limited to the embodiments. In contrast, the embodiments are provided for a more thorough and complete understanding of the present disclosure. It should be understood that the drawings and the embodiments in the present disclosure are only illustrative of the disclosure, and are not intended to limit the protection scope of the present disclosure.

It should be understood that the steps of the method according to the embodiments of the present disclosure may be performed in different orders, and/or be performed in parallel. In addition, the method embodiments may include an additional step and/or omit to perform the illustrated steps. The scope of the present disclosure is not limited in this aspect.

The term "including" and variants thereof as used herein are open-ended includes, that is, "including but not limited to". The term "based on" means "based at least in part on." The term "one embodiment" means "at least one embodiment". The term "another embodiment" means "at least one additional embodiment". The term "some embodiments" means "at least some embodiments". Definitions of other terms are provided in the following description.

It should be noted that the concepts such as "first" and "second" mentioned in the present disclosure are used to distinguish different apparatuses, modules or units, and are not used to limit an sequential order or interdependence of the functions performed by the apparatus, modules or units.

It should be noted that, the terms "one" and "multiple" mentioned in the present disclosure are schematic rather than restrictive, and should be understood as "one or more" by those skilled in the art, otherwise explicitly illustrated in the context.

The names of messages or information exchanged between multiple apparatuses in the embodiments of the present disclosure are only for illustrative purposes, and are not intended to limit the scope of the messages or information.

In the field of audio/video processing, audio/video editing generally includes three layers of structure, namely, a business layer (foreground), a SDK layer (middle platform), and an algorithm layer (background). SDK is the abbreviation of Software Development Kit. The business layer is responsible for receiving user operations, that is, a client. The SDK layer is responsible for data transmission, such as transferring the data to be processed to the algorithm layer and obtaining a processing result from the algorithm layer, and further processing the data based on the obtained processing result. For example, the SDK layer may be responsible for posterize time, encoding and decoding, transmission, etc. of an audio/video, and a processing strategy for data may be set in the SDK layer. The algorithm layer is responsible for processing the data imported from the SDK layer and outputting a processing result to the SDK layer.

The methods according to the present disclosure are mainly applied to a scene of generating a video (that is, generating a video with a dolly zoom effect), and the relevant algorithms used in the present disclosure are integrated in the algorithm layer. In the method according to the present disclosure, a step related to data processing may be performed on the SDK layer (middle platform), and the final processing result (for example, a target video) may be displayed on the client.

FIG. 1 is a flowchart of a video generation method according to an embodiment of the present disclosure. As shown in FIG. 1, the method may include steps 11 to 14.

In step 11, an original image corresponding to a target frame is acquired and a target object is identified in the original image.

In step 12, dolly zoom processing is performed on an initial background image in the original image other than the target object in a dolly zoom strategy, to obtain a target background image.

In step 13, an image of the target object is superimposed onto the target background image based on the position of the target object in the original image to obtain a target image corresponding to the target frame.

In step 14, a target video is generated based on the target image corresponding to the target frame.

In steps 11 to 13, a process of performing dolly zoom processing on a certain image (that is, the original image corresponding to the target frame) to generate the target image is described. In practical applications, multiple target images for multiple target frames needs to be generated through steps 11 to 13, and form the target video based on the target images and a time sequence of the target frames corresponding to the target images.

The original image corresponding to the target frame is acquired, and then the target object in the original image is identified. That is, a picture subject in the original image is identified. In an embodiment, the picture subject (i.e., the target object) may be preset. For example, a person is set as the target object. In this case, identification of the target object in the original image is actually identification of the person in the original image. For another example, an object occupying the largest proportion of the picture is set as the target object. In this case, identification of the target object in the original image is actually identification of the object occupying a higher proportion of the picture in the original image.

As described above, the video with the dolly zoom effect is to ensure that the picture subject of the image in the video remains unchanged while the perspective relationship of the background is changed. In this case, two aspects of processing are required. In one aspect, it is ensured that the picture subject in the video is unchanged. In the other aspect, the perspective relationship of the background is changed.

In the first aspect, it is ensured that the picture subject in the video is unchanged. Thus, the sizes and positions of the target objects of the target images corresponding to respective target frames in the target video are the same. That is, the target object has a desired position in the picture. In the final target video with the dolly zoom effect, the target object in each image of the target video should be at this desired position. For example, the desired position may be manually selected, for example, as the picture center. For another example, the desired position may be determined based on the original image corresponding to each target frame. For example, the position of the target object in the original image corresponding to the earliest target frame is taken as the desired position of the target object in the entire target video.

In the second aspect, the perspective relationship of the background needs to be changed. Thus, the dolly zoom processing is required to perform on an initial background image in the original image other than the target object in a dolly zoom strategy, to obtain the target background image. Here, the dolly zoom strategy is used to change the perspective relationship of the initial background image in the original image. That is, the initial background image zooms on the basis of the picture tracking up or tracking back. There is a shooting position, that is, the lens position when the original image is shot. The picture tracking up or tracking back is to simulate the picture that can be shot by the lens tracking up or tracking back in the three-dimensional image space corresponding to the original image, which mainly changes the perspective relationship of the initial background image; and zoom is to enlarge or reduce the picture.

The dolly zoom strategy is at least used to indicate the dolly direction and the zoom direction of the initial background image. The dolly direction is opposite to the zoom direction. In a process of image processing related to the perspective relationship, the image processing may be performed based on a perspective point. The dolly direction may be close to or far away from the perspective point. If the dolly direction is close to the perspective point, it means that the picture tracks up towards the target object (equivalent to the lens moving towards the target object). If the dolly direction is far away from the perspective point, it means that the picture moves backward from the target object (equivalent to the lens moving away from the target object). The zoom direction may be close to or far away from the perspective point. If the zoom direction is close to the perspective point, it means that the viewing angle becomes small (the focal length is increased). If the zoom direction is far away from the perspective point, it means that the viewing angle becomes large (the focal length is reduced). As described above, in the dolly zoom strategy, the dolly direction is opposite to the zoom direction. For example, if the dolly direction is close to the perspective point, the zoom direction is far away from the perspective point.

Dolly zoom processing may be performed on the initial background image in the original image other than the target object in the dolly zoom strategy, to obtain the target background image. Furthermore, an image of the target object is superimposed onto the target background image based on the position of the target object in the original image, to obtain a target image corresponding to the target frame.

As described above, there is a desired position for the target object in the picture. Therefore, if the desired position does not match the position of the target object in the original image (for example, the positions are different), further processing is required to performed on the image of the target object, to match the image obtained after the image processing is performed on the target object with the desired position. For example, if the desired position is the center of the picture and occupies 50% of the picture, and the target object is at the center of the picture in the original image but only occupies 25% of the picture, it is necessary to enlarge the image of the target object. Thus, the processed image is in the center of the picture and occupies 50% of the picture.

With reference to the above processing method, the target video may be generated based on the target object corresponding to the target frame. In fact, the number of the target frame may be multiple. In this case, multiple target images are respectively generated for the multiple target frames. Thus, based on the target images corresponding to the respective target frames, the target video with the dolly zoom effect is generated in a time sequence of the target frames. The target object has the same position in each of frames of the target video. Moreover, the sizes of the frames in the target video are the same.

Figure 2:
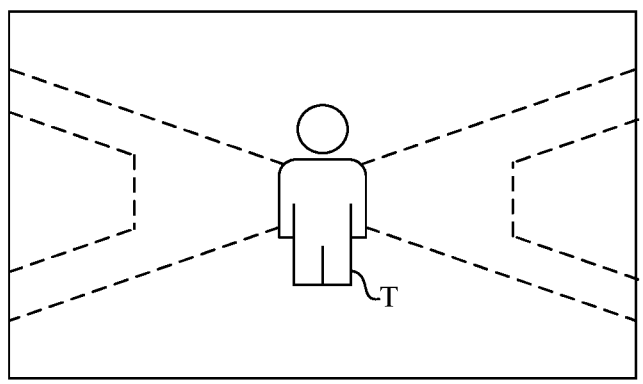
FIGS. 2 and 3 are exemplary schematic diagrams of two image frames in a target video.
Figure 3:
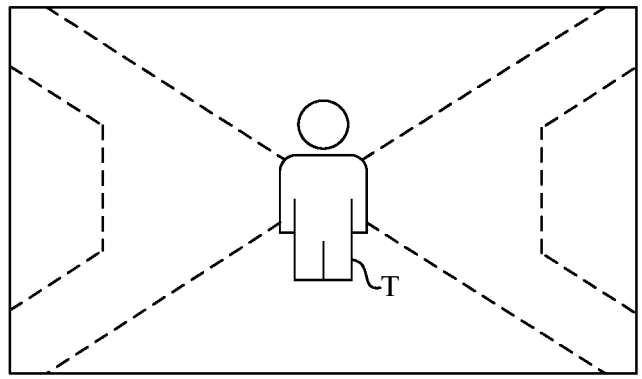

By way of example, FIGS. 2 and 3 are schematic diagrams showing effect of a video generation method according to the present disclosure. FIG. 2 is a prior video frame in the target video, and FIG. 3 is a posterior video frame in the target video. In FIGS. 2 and 3, T is the target object, and a portion shown by the dotted line represents the background. It can be seen that in FIGS. 2 and 3, the position and size of the target object have no change. In addition, compared with FIG. 2, the background part in FIG. 3 is tracked up. In the visual sense, the background behind T is closer in FIG. 3. FIG. 3 can be obtained by performing the dolly zoom on FIG. 2 in a direction towards the behind of the target object T. This dolly zoom causes a change in the perspective relationship of the background part. With reference to FIGS. 2 and 3, multiple video frames in the target video are similar to those, so as to obtain the target video with the dolly zoom effect.

Through the above technical solution, an original image corresponding to a target frame is acquired and a target object in the original image is identified; dolly zoom processing is performed on an initial background image in the original image other than the target object in a dolly zoom strategy, to obtain a target background image; and the image of the target object is superimposed onto the target background image based on the position of the target object in the original image, to obtain a target image corresponding to the target frame; and a target video is generated based on the target image corresponding to the target frame. Therefore, the dolly zoom effect can be automatically added to an image based on the image itself, to ensure that a picture subject of the image remains unchanged while the perspective relationship of the background is changed. Thus, a video with the subject unchanged and the background quickly compressed or enlarged, that is, the target video with the dolly zoom effect, can be generated based on a series of such images. In this way, a video with a dolly zoom effect can be obtained without using specific shooting techniques or manual processing, and the data processing efficiency is high.

In order to enable those skilled in the art to better understand the technical solution according to the embodiments of the present invention, the steps above are described in detail below.

First, a manner of acquiring the original image corresponding to the target frame in step 11 will be described in detail.

In a possible embodiment, the original image corresponding to the target frame may be acquired by: acquiring the original image corresponding to the target frame from a media file to be processed.

The media file to be processed is an image or video containing the target object.

In an embodiment, a post-processing is performed on the stored image or video. That is, post-processing is performed on the shot image or video, to obtain a video with the dolly zoom effect.

The media file to be processed is an image containing the target object. That is, only one existing image is processed. Here, the original image corresponding to the respective target frames is the media file to be processed, and the same original image is obtained for the respective target frames. The solution of the present disclosure is equivalent to perform dolly zoom on a background based on only one image to generate multiple target images corresponding to different target frames, and the multiple target images are synthesized into the target video.

If the media file to be processed is the video containing the target object, the time sequence of the target frames may follow the sequence of the video frames in the media file to be processed. For example, the original image is acquired from the media file to be processed in a positive (or reverse) sequence. If the sequence is positive, a prior video frame in the media file to be processed corresponds to a prior target frame. On the contrary, if the sequence is reverse, a posterior video frame in the media file to be processed corresponds to a posterior target frame.

In another possible embodiment, the original image corresponding to the target frame is acquired by: acquiring the original image corresponding to the target frame, from an information stream collected in real time by an image collection apparatus.

In this embodiment, real-time processing is performed on the information stream acquired in real time. That is, in a process of shooting an image or video, the original image of the target frame is acquired in real time, and the operations from step 11 to step 13 are performed to obtain the target image corresponding to the target frame, so as to generate the target video subsequently.

A manner for identifying the target object in the original image in step 11 will be described in detail below.

In a possible embodiment, the target object in the original image may be identified by identifying the target object in the original image by using a pre-trained target object identification model.

The target object identification model is configured to identify the target object in the image, for example, to identify the contour of the target object or the position of the target object in the image. The target object identification model is equivalent to a classification model, that is, pixels belonging to the target object are identified from the image. For example, a target object classification model may be obtained by acquiring multiple groups of training data, where each group of training data includes a training image and marking information indicating whether each pixel in the training image belongs to the target object; and training a model by a neural network model based on the multiple groups of training data, to obtain the target object classification model.

In each training process, a training image in one group of training data is taken as input data, the marking information of the training image is taken as real output. The neural network model compares an actual output of the input training image with the real output. A comparison result (for example, a loss value calculated by the actual output and the real output) is applied to the neural network model to adjust internal parameters of the neural network model. The training process is repeated in this way, until the conditions for stopping training the model are met (for example, the number of training reaches a certain number of times, or the loss value is less than a certain threshold, etc.). In this way, the obtained model is used as the target object classification model. The model training method belongs to the common knowledge in the art. The above is only for illustration, and other realizable methods will not be described in the present disclosure.

In another possible embodiment, the target object in the original image may be identified by: identifying the target object in the original image by historical position information corresponding to the target object.

The historical position information is obtained by performing motion tracking on an image prior to the original image.

The position of the target object in the original image may be inferred from the historical location information. For example, a motion trend of the target object may be determined through the historical position information of the target object. The position of the target object in a reference image that is closest to the original image in time prior to the original image may be taken as the starting point. The change in position of the target object in the original image relative to that in the reference image is determined, based on the motion trend of the target object in the historical position information and a shooting time difference between the reference image and the original image. In this way, the position of the target object in the original image can be inferred to identify the target object in the original image.

With the above method, the position of the target object in the original image can be determined directly through the motion tracking of the target object in history, to identify the target object in the original image, and the data processing amount is small.

The step of performing dolly zoom processing on an initial background image in the original image other than the target object in a dolly zoom strategy, to obtain a target background image in step 12 will be described in detail below.

Figure 4:
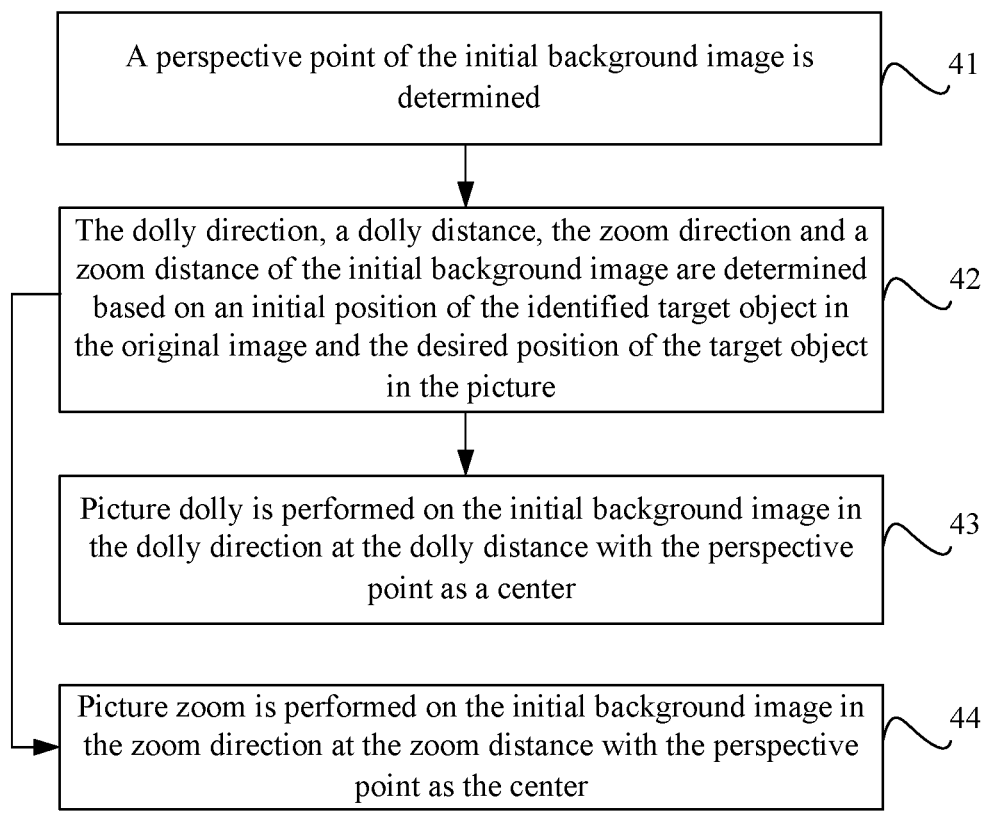
FIG. 4 is an exemplary flowchart of steps of performing dolly zoom processing on an initial background image in the original image other than the target object in a dolly zoom strategy, to obtain a target background image in the video generation method according to the present disclosure.

In a possible embodiment, step 12 may include the following steps, as shown in FIG. 4.

In step 41, a perspective point of the initial background image is determined.

In step 42, the dolly direction, a dolly distance, the zoom direction and a zoom distance of the initial background image are determined based on an initial position of the identified target object in the original image and the desired position of the target object in the picture.

In step 43, picture dolly is performed on the initial background image in the dolly direction at the dolly distance with the perspective point as a center.

In step 44, picture zoom is performed on the initial background image in the zoom direction at the zoom distance with the perspective point as the center.

In an image processing, especially the image processing related to perspective relationship, it is generally necessary to use the perspective point in the image. Therefore, the perspective point of the initial background image needs to be determined firstly to prepare for the subsequent dolly zoom processing.

In a possible embodiment, step 41 may include: determining a center point of the original image as the perspective point.

In a shooting process of an image or video, the picture subject is generally placed in the center of the picture for shooting, which conforms to a general rule of one point perspective. A vanishing point of the background is also generally located in the center of the picture. Thus, the determination of the center point of the image as the perspective point for dolly zoom is a fast and stable way for determining the perspective point.

In another possible embodiment, step 41 may include: acquiring depth information of the original image; determining a vanishing point position of the original image based on the depth information; and taking the vanishing point position as the perspective point.

The depth information hidden in a two-dimensional image may help to understand a three-dimensional structure of an image scene. As a well-known technology in this field, the understanding of depth information of the two-dimensional image is widely used in this field. For example, the depth information of the two-dimensional image can be understood through shading, lighting, geometric analysis, feature learning, etc. The specific methods will not be described here.

Therefore, the depth information of the original image may be acquired based on the original image, and then a position of the vanishing point in the original image is determined based on the depth information. Furthermore, the position of the vanishing point may be directly used as the perspective point. The three-dimensional image space corresponding to the original image can be constructed based on the depth information of the original image. The position of the vanishing point may be obtained based on the vanishing point identification method commonly used in the conventional technology.

When the dolly zoom processing is required to be performed on the original image, not only the perspective point, but also the dolly processing method and zoom processing method need to be determined. The dolly processing method may include the dolly direction and the dolly distance. The zoom processing method may include the zoom direction and the zoom distance. The meanings of the dolly direction and zoom direction have been listed in detail above, which will not be described again here. The dolly distance refers to a distance that the lens should be tracked up or back in the three-dimensional image space corresponding to the original image. The zoom distance refers to a distance of focus change. Therefore, it is necessary to continue to perform step 42 to determine the dolly direction, the dolly distance, the zoom direction and the zoom distance of the initial background image.

In a possible embodiment, step 42 may include the following steps: determining first coordinates of the initial position in the three-dimensional image space corresponding to the original image; determining second coordinates of the desired position in the three-dimensional image space; and determining the dolly direction, the dolly distance, the zoom direction and the zoom distance based on the first coordinates and the second coordinates.

As described above, the three-dimensional image space corresponding to the original image may be constructed based on the original image. In this three-dimensional space, coordinates, namely the first coordinates, may be determined based on the initial position of the target object in the original image; and coordinates, namely the second coordinates, may be determined based on the desired position of the target object. The purpose of dolly zoom is to locate the target object at the desired position. In this process, due to a difference between the initial position and the desired position of the target object, the background may change correspondingly, that is, the background changes from a picture that can be shot at the first coordinates to a picture that can be shot at the second coordinates. Therefore, the dolly direction, the dolly distance, the zoom direction and the zoom distance may be determined based on the first coordinates and the second coordinates. For example, if the second coordinates are closer to the perspective point than the first coordinates, the dolly direction should be a direction close to the perspective point, the dolly distance is a distance that should pass from the first coordinates to the second coordinates, the zoom direction is a direction away from the perspective point, and the zoom distance is a change of the focal length of lens from the first coordinates to the second coordinates.

After the dolly direction, the dolly distance, the zoom direction and the zoom distance are determined by step 42, the dolly zoom processing may be performed on the initial background image on the basis of the dolly direction, the dolly distance, the zoom direction and the zoom distance, that is, steps 43 and 44 are executed. In the present disclosure, the execution sequence of steps 43 and 44 are not strictly defined, which may be executed simultaneously or successively.

Since the dolly zoom processing of the image involves a picture change, the problem of missing the background may occur. Thus, background supplement processing may be carried out to a certain extent. The image obtained after background supplement processing is used as the initial background image for dolly zoom processing, so that the background of the obtained target background image is intact, and then the obtained target image is complete and intact. Based on this, the method according to the present disclosure may further include: removing the target object from the original image to obtain a first background image; acquiring a second background image located at the area covered by the target object in the original image; and supplementing, based on a position of the area covered by the target object, the second background image into the first background image to obtain the initial background image.

First, the target image is removed from the original image to obtain the first background image. At this time, a part of the first background image is missing. In order to ensure the completeness of the background of the final generated target image, the missing part may be supplemented.

Therefore, the second background image located at the area covered by the target object in the original image may be acquired, and the second background image is added to the first background image based on the position of the area covered by the target object to obtain the initial background image.

Multiple methods may be used to acquire the second background image located at the area covered by the target object in the original image. For example, some images for background supplement may be set in advance, and the second background image is acquired directly from these images. For another example, a partial image may be extracted from the first background image as the second background image based on the first background image. For another example, image inpainting may be performed on the missing part in the first background image (for example, the existing image repair algorithm, image inpainting algorithm, etc. are used for image filling) based on the first background image, and the inpainted image content is used as the second background image.

In this way, the obtained initial background image is complete, and the target background image obtained by performing the dolly zoom processing on the initial background image is also complete. Thus, the target image obtained after covering the image of the target object on the target background image is also complete, and no background is missing, ensuring the information completeness of the image.

Figure 5:
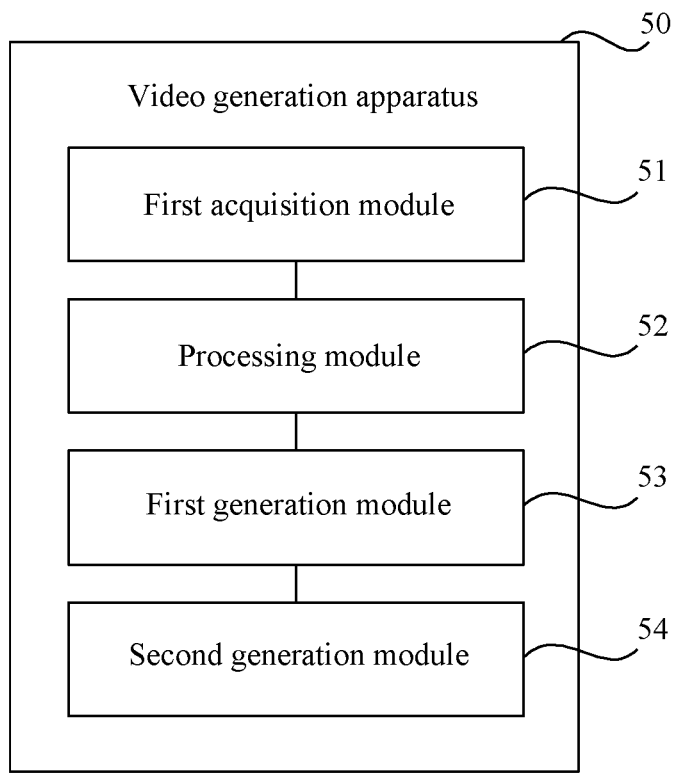
FIG. 5 is a block diagram of a video generation apparatus according to an embodiment of the present disclosure.

FIG. 5 is a block diagram of a video generation apparatus according to an embodiment of the present disclosure. As shown in FIG. 5, the video generation apparatus 50 may include: a first acquisition module 51, a processing module 52, a first generation module 53 and a second generation module 54.

The first acquisition module 51 is configured to acquire an original image corresponding to a target frame and identify a target object in the original image.

The processing module 52 is configured to perform dolly zoom processing on an initial background image in the original image other than the target object in a dolly zoom strategy, to obtain a target background image, wherein the dolly zoom strategy is at least used to indicate a dolly direction and a zoom direction of the initial background image, and the dolly direction is opposite to the zoom direction.

The first generation module 53 is configured to superimpose an image of the target object onto the target background image based on a position of the target object in the original image, to obtain a target image corresponding to the target frame.

The second generation module 54 is configured to generate a target video based on the target image corresponding to the target frame.

Optionally, the first acquisition module 51 includes: a first identification sub-module or a second identification sub-module.

The first identification sub-module is configured to identify the target object in the original image by a pre-trained target object identification model.

The second identification sub-module configured to identify the target object in the original image through historical position information corresponding to the target object, where the historical position information is obtained by performing motion tracking on an image prior to the original image.

Optionally, the processing module 52 includes: a first determination sub-module, a second determination sub-module, a third determination sub-module and a fourth determination sub-module.

The first determination sub-module is configured to determine a perspective point of the initial background image.

The second determination sub-module is configured to determine the dolly direction, a dolly distance, the zoom direction and a zoom distance of the initial background image based on an initial position of the identified target object in the original image and a desired position of the target object in a picture.

The third determination sub-module is configured to perform a picture dolly on the initial background image in the dolly direction at the dolly distance with the perspective point as a center.

The fourth determination sub-module is configured to perform a picture zoom on the initial background image in the zoom direction at the zoom distance with the perspective point as the center.

Optionally, the first determination sub-module is configured to determine a center point of the original image as the perspective point; or the first determination sub-module is configured to acquire depth information of the original image; determine a vanishing point position in the original image based on the depth information; take the vanishing point position as the perspective point.

Optionally, the second determination sub-module is configured to: determine first coordinates of the initial position in a three-dimensional image space corresponding to the original image; determine second coordinates of the desired position in the three-dimensional image space; and determine the dolly direction, the dolly distance, the zoom direction and the zoom distance based on the first coordinates and the second coordinates.

Optionally, the apparatus further includes: an image removal module, a second acquisition module, and a supplement module.

The image removal module is configured to remove the target object from the original image to obtain a first background image.

The second acquisition module is configured to acquire a second background image located at an area covered by the target object in the original image.

The supplement module is configured to supplementing the second background image into the first background image based on a position of the area covered by the target object, to obtain the initial background image.

Optionally, the first acquisition module 51 is configured to acquire the original image corresponding to the target frame from a media file to be processed, where the media file to be processed is an image or video containing the target object; or the first acquisition module 51 is configured to acquire the original image corresponding to the target frame, from an information stream collected in real time by an image collection apparatus.

For the apparatus according to the embodiments described above, the manners in which the modules perform operations have been described in detail in the embodiments of the method, which will not be described in detail herein.

Figure 6:
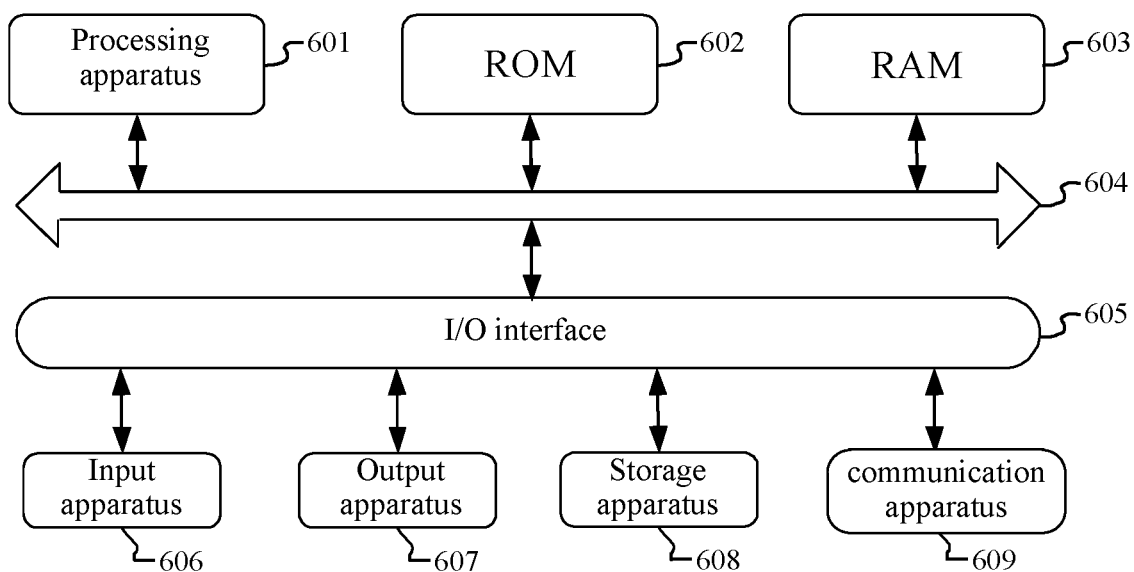
FIG. 6 shows a structural schematic diagram of an electronic device suitable for implementing an embodiment of the present disclosure.

Reference is made to FIG. 6, which shows a schematic structural diagram of an electronic device 600 suitable for implementing the embodiments of the present disclosure. The terminal equipment according to the embodiments of the present disclosure may include, but are not limited to, mobile terminals, such as mobile phones, laptops, digital broadcast receivers, PDAs (personal digital assistants), PADs (tablet PCs), PMPs (portable multimedia players), vehicle-mounted terminals (such as in-vehicle navigation terminals) and the like, and fixed terminals such as digital TVs, desktop computers, and the like. The electronic device shown in FIG. 6 is only exemplary, and should not indicate any limitation to the function and application scope of the embodiments of the present disclosure.

As shown in FIG. 6, the electronic device 600 may include a processing apparatus 601, such as a central processing unit or a graphics processor, which may execute various operations and processing based on a program stored in a Read Only Memory (ROM) 602 or a program loaded from a storage 608 into a Random Access Memory (RAM) 603. The RAM 603 is further configured to store various programs and data required by the electronic device 600. The processing apparatus 601, the ROM 602 and the RAM 603 are connected to each other through a bus 604. An Input/output (I/O) interface 605 is also connected to the bus 604.

Generally, the I/O interface 605 may be connected to: an input apparatus 606, such as a touch picture, a touch panel, a keyboard, a mouse, a camera, a microphone, an accelerometer, and a gyroscope; an output apparatus 607, such as a liquid crystal display (LCD), a speaker, and a vibrator; a storage apparatus 608 such as a magnetic tape and a hard disk; and a communication apparatus 609. The communication apparatus 609 enables wireless or wired communication between the electronic device 600 and other devices for data exchanging. Although FIG. 6 shows an electronic device 600 having various apparatuses, it should be understood that the illustrated apparatuses are not necessarily required to all be implemented or embodied. Alternatively, more or fewer apparatuses may be implemented or included.

Particularly, according to the embodiments of the present disclosure, the process described above in conjunction with flowcharts may be implemented as a computer software program. For example, a computer program product is further provided as an embodiment in the present disclosure, including a computer program carried on a non-transitory computer readable medium. The computer program includes program code for performing the method shown in the flowchart. In the embodiment, the computer program may be downloaded and installed from the network via the communication apparatus 609, or installed from the storage apparatus 608, or installed from the ROM 602. When the computer program is executed by the processing apparatus 601, the functions defined in the method according to the embodiment of the present disclosure are performed.

It should be noted that, the computer readable medium mentioned in the present disclosure may be a computer readable signal medium or a computer readable storage medium or any combination thereof. The computer readable storage medium may be but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any proper combination thereof. In the present disclosure, the computer readable storage medium may be any tangible medium containing or storing a program, and the program may be used by or in combination with an instruction execution system, apparatus, or device. In the present disclosure, the computer readable signal medium may be a data signal propagated in a baseband or propagated as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and can send, propagate or transmit programs to be used by or in combination with an instruction execution system, apparatus or device. The program codes stored in the computer readable medium may be transmitted via any proper medium including but not limited to: a wire, an optical cable, RF(radio frequency) and the like, or any proper combination thereof.

In some embodiments, the client device and the server may perform communication using any currently known or future developed network protocol such as HTTP (HyperText Transfer Protocol), and may be interconnected with any form or medium of digital data communication (for example, a communication network). Examples of a communication network include a local area network ("LAN"), a wide area network ("WAN"), the Internet Work (for example, the Internet), and a peer-to-peer network (for example, an ad hoc peer-to-peer network), as well as any currently known network or a future developed network.

The computer readable medium may be incorporated in the electronic device, or may exist alone without being assembled into the electronic device.

The computer readable medium carries one or more programs. When executed by the electronic device, the one or more programs cause the electronic device to: acquire an original image corresponding to a target frame and identify a target object in the original image; and perform dolly zoom processing on an initial background image in the original image other than the target object in a dolly zoom strategy, to obtain a target background image, wherein the dolly zoom strategy is at least used to indicate a dolly direction and a zoom direction of the initial background image, and the dolly direction is opposite to the zoom direction; superimpose an image of the target object onto the target background image based on a position of the target object in the original image to obtain the target image corresponding to the target frame; and generate a target video based on the target image corresponding to the target frame.

The computer program code for performing the operations disclosed in the embodiments of the present disclosure may be written in one or more programming languages or combinations thereof. The programming languages include, but not limit to an object-oriented programming language, such as Java, Smalltalk, and C++, and a conventional procedural programming language, such as C language or a similar programming language. The program code may be executed entirely on a user computer, partially on the user computer, as a standalone software package, partially on the user computer and partially on a remote computer, or entirely on the remote computer or a server. In a case involving a remote computer, the remote computer may be connected to the user computer through any network, including local area network (LAN) or wide area network (WAN), or may be connected to an external computer (for example, through the Internet provided by an Internet service provider).

Flowcharts and block diagrams in the drawings illustrate the architecture, functions and operations that can be implemented by a system, a method and a computer program produce according to various embodiments of the present disclosure. In this regard, each block in the flowchart or the block diagram may represent a module, a program segment, or a part of code. The module, the program segment, or the part of codes includes one or more executable instructions used for implementing specified logic functions. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each of the block in the block diagram and/or flowchart and a combination of the blocks in the block diagram and/or flowchart may be implemented by a dedicated hardware-based system that performs specified functions or actions, or may be realized by a combination of dedicated hardware and computer instructions.

The modules mentioned in the embodiments of the present disclosure may be implemented by means of software, or otherwise by means of hardware. In some circumstances, name of a module does not constitute a limitation on the module itself. For example, a first acquisition module may also be described as "a module for acquiring an original image corresponding to a target frame and identifying a target object in the original image".

The functions described herein above may be performed, at least in part, by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and the like.

In the context of the present disclosure, the machine readable medium may be a tangible medium that may contain or store a program, and the program may be used by or in connection with an instruction execution system, apparatus or device. The machine readable medium may be a machine readable signal medium or a machine readable storage medium. The computer readable medium may include, but is not limited to, system, an apparatus, or a device in an electronic, magnetic, optical, electromagnetic, infrared, or semi-conductive form, or any proper combination thereof. More specific examples of the machine readable storage medium may include, one or more wire based electrical connections, a portable computer disk, a hard disk, a random access memory (RAM), a read-only memory (ROM), an erasable programmable read-only memory (EPROM or Fast flash memory), an optical fiber, a portable compact disc read-only memory (CD-ROM), an optical storage device, a magnetic storage device or any proper combination thereof.

According to one or more embodiments of the present disclosure, a video generation method is provided. The video generation method includes:
  acquiring an original image corresponding to a target frame, and identifying the target object in the original image;
  performing dolly zoom processing on an initial background image in the original image other than the target object in a dolly zoom strategy, to obtain a target background image, wherein the dolly zoom strategy is at least used to indicate a dolly direction and a zoom direction of the initial background image, and the dolly direction is opposite to the zoom direction;
  superimposing an image of the target object onto the target background image based on a position of the target object in the original image, to obtain a target image corresponding to the target frame;
  generating a target video based on the target image corresponding to the target frame.

According to one or more embodiments of the present disclosure, in the video generation method, the identifying a target object in the original image includes:
  identifying the target object in the original image by a pre-trained target object identification model; or
  identifying the target object in the original image through historical position information corresponding to the target object, where the historical position information is obtained by performing motion tracking on an image prior to the original image.

According to one or more embodiments of the present disclosure, in the video generation method, the performing the dolly zoom processing on an initial background image in the original image other than the target object in a dolly zoom strategy, to obtain a target background image includes:
  determining a perspective point of the initial background image;
  determining the dolly direction, a dolly distance, the zoom direction and a zoom distance of the initial background image based on an initial position of the identified target object in the original image and a desired position of the target object in a picture;
  performing a picture dolly on the initial background image in the dolly direction at the sliding distance with the perspective point as a center; and
  performing a picture zoom on the initial background image in the zoom direction at the zoom distance with the perspective point as a center.

According to one or more embodiments of the present disclosure, in the video generating method, the determining a perspective point of the initial background image includes:
  determining a center point of the original image as the perspective point; or
  the determining a perspective point of the initial background image includes:
  acquiring depth information of the original image;
  determining a vanishing point position in the original image based on the depth information; and
  taking the vanishing point position as the perspective point.

According to one or more embodiments of the present disclosure, in the video generating method, the determining the dolly direction, a dolly distance, the zoom direction and a zoom distance of the initial background image based on an initial position of the identified target object in the original image and a desired position of the target object in a picture includes:
  determining first coordinates of the initial position in a three-dimensional image space corresponding to the original image;
  determining second coordinates of the desired position in the three-dimensional image space; and
  determining the dolly direction, the dolly distance, the zoom direction and the zoom distance based on the first coordinates and the second coordinates.

According to one or more embodiments of the present disclosure, the video generating method further includes:
  removing the target object from the original image to obtain a first background image;
  acquiring a second background image located at an area covered by the target object in the original image; and
  supplementing the second background image into the first background image based on a position of the area covered by the target object, to obtain the initial background image.

According to one or more embodiments of the present disclosure, in the video generation method is provided, the acquiring an original image corresponding to a target frame includes:
  acquiring the original image corresponding to the target frame from a media file to be processed, where the media file to be processed is an image or video containing the target object; or
  acquiring the original image corresponding to the target frame, from an information stream collected in real time by an image collection apparatus.

According to one or more embodiments of the present disclosure, a video generation apparatus is provided. The video generation apparatus includes:
  a first acquisition module configured to acquire an original image corresponding to a target frame and identify a target object in the original image;
  a processing module configured to perform dolly zoom processing on an initial background image in the original image other than the target object in a dolly zoom strategy to obtain a target background image, wherein the dolly zoom strategy is at least used to indicate a dolly direction and a zoom direction of the initial background image, and the dolly direction is opposite to the zoom direction;
  a first generation module configured to superimpose an image of the target object onto the target background image based on a position of the target object in the original image, to obtain a target image corresponding to the target frame; and a second generation module configured to generate a target video based on the target image corresponding to the target frame.

According to one or more embodiments of the present disclosure, a computer readable medium storing a computer program thereon is provided. The program, when executed by a processing apparatus, performs steps of the video generation method according to any embodiment of the present disclosure.

According to one or more embodiments of the present disclosure, an electronic device is provided. The electronic device includes:

a storage apparatus storing a computer program thereon;
a processing apparatus configured to execute the computer program stored in the storage apparatus to perform steps of the video generation method according to any embodiment of the present disclosure.

The above description includes merely preferred embodiments of the present disclosure and explanations of technical principles used. Those skilled in the art should understand that the scope of the present disclosure is not limited to the technical solution formed by combination of the technical features described above, but also covers other technical solutions formed by any combination of the above technical features or the equivalent features of the technical features without departing from the concept of the present disclosure. For example, a technical solution formed by interchanging the above features and technical features having similar functions as disclosed, but not limited to, in the present disclosure with each other is also covered with the scope of the present disclosure.

It should be noted that although the above operations are described in a specific order, it should not be understood that these operations are required to be performed in the specific order or performed in a sequential order. Under certain circumstances, multitasking and parallel processing may be advantageous. Although multiple implementation details are included in the above descriptions, the details should not be interpreted as limitations to the scope of the present disclosure. The features described in multiple separate embodiments may be implemented in combination in a separate embodiment. Conversely, the features described in a separate embodiment may be implemented in multiple embodiments individually or in any suitable sub-combination.

Although the subject matter has been described in language specific to structural features and/or logical actions of the method, it should be understood that the subject matter defined in the appended claims are unnecessarily limited to the specific features or actions described above. The specific features and actions described above are merely exemplary forms of implementing the claims. For the apparatus according to the embodiments described above, the manners in which the modules perform operations have been described in detail in the embodiments of the method, which are not described in detail herein.

The invention claimed is:

1. A video generation method, comprising:
acquiring an original image corresponding to a target frame, and identifying a target object in the original image;
performing dolly zoom processing on an initial background image in the original image other than the target object in a dolly zoom strategy, to obtain a target background image, wherein the dolly zoom strategy is at least used to indicate a dolly direction and a zoom direction of the initial background image, and the dolly direction is opposite to the zoom direction;
superimposing an image of the target object onto the target background image based on a position of the target object in the original image, to obtain a target image corresponding to the target frame; and
generating a target video based on the target image corresponding to the target frame,
wherein the performing dolly zoom processing on an initial background image in the original image other than the target object in a dolly zoom strategy, to obtain a target background image comprises:
determining a perspective point of the initial background image;
determining the dolly direction, a dolly distance, the zoom direction and a zoom distance of the initial background image, based on an initial position of the identified target object in the original image and a desired position of the target object in a picture;
performing a picture dolly on the initial background image in the dolly direction at a sliding distance with the perspective point as a center; and
performing a picture zoom on the initial background image in the zoom direction at the zoom distance with the perspective point as the center.

2. The video generation method according to claim 1, wherein the identifying a target object in the original image includes:
identifying the target object in the original image by a pre-trained target object identification model; or
identifying the target object in the original image through historical position information corresponding to the target object, wherein the historical position information is obtained by performing motion tracking on an image prior to the original image.

3. The video generation method according to claim 1, wherein the determining a perspective point of the initial background image includes:
determining a center point of the original image as the perspective point; or
the determining a perspective point of the initial background image includes:
acquiring depth information of the original image;
determining a vanishing point position in the original image based on the depth information; and
taking the vanishing point position as the perspective point.

4. The video generation method according to claim 1, wherein the determining the dolly direction, a dolly distance, the zoom direction and a zoom distance of the initial background image based on an initial position of the identified target object in the original image and a desired position of the target object in a picture includes:
determining first coordinates of the initial position in a three-dimensional image space corresponding to the original image;
determining second coordinates of the desired position in the three-dimensional image space;
determining the dolly direction, the dolly distance, the zoom direction and the zoom distance based on the first coordinates and the second coordinates.

5. The video generation method according to claim 1, further comprising:
processing the original image in a case that the position of the target object in the original image does not match the desired position of the target object in the picture, to match the position of the target object in the processed image with the desired position, and recording a position of the target object in a processed image as the initial position.

6. The video generation method according to claim 1, further comprising:
removing the target object from the original image to obtain a first background image;
acquiring a second background image located at an area covered by the target object in the original image;
supplementing the second background image into the first background image based on a position of the area covered by the target object, to obtain the initial background image.

7. The video generation method according to claim 6, wherein the acquiring a second background image located at an area covered by the target object in the original image includes:
obtaining the second background image from a preset background supplement image; or
extracting partial image from the first background image, and taking the extracted image as the second background image; or
performing image inpainting on a missing part of the first background image, and taking an image after the image inpainting as the second background image.

8. The video generation method according to claim 1, wherein the acquiring an original image corresponding to a target frame includes:
acquiring the original image corresponding to the target frame from a media file to be processed, wherein the media file to be processed is an image or video containing the target object; or
acquiring the original image corresponding to the target frame, from an information stream collected in real time by an image collection apparatus.

9. A non-transitory computer readable medium storing a computer program thereon, wherein the program, when executed by a processing apparatus, causes the processing apparatus to
acquire an original image corresponding to a target frame, and identify a target object in the original image;
perform dolly zoom processing on an initial background image in the original image other than the target object in a dolly zoom strategy, to obtain a target background image, wherein the dolly zoom strategy is at least used to indicate a dolly direction and a zoom direction of the initial background image, and the dolly direction is opposite to the zoom direction;
superimpose an image of the target object onto the target background image based on a position of the target object in the original image, to obtain a target image corresponding to the target frame; and
generate a target video based on the target image corresponding to the target frame,
wherein the program, when executed by a processing apparatus, causes the processing apparatus further to
determine a perspective point of the initial background image;
determine the dolly direction, a dolly distance, the zoom direction and a zoom distance of the initial background image, based on an initial position of the identified target object in the original image and a desired position of the target object in a picture;
perform a picture dolly on the initial background image in the dolly direction at a sliding distance with the perspective point as a center; and
perform a picture zoom on the initial background image in the zoom direction at the zoom distance with the perspective point as the center.

10. An electronic device, comprising:
a storage apparatus storing a computer program thereon;
a processing apparatus configured to execute the computer program stored in the storage apparatus to:
acquire an original image corresponding to a target frame, and identify a target object in the original image;
perform dolly zoom processing on an initial background image in the original image other than the target object in a dolly zoom strategy, to obtain a target background image, wherein the dolly zoom strategy is at least used to indicate a dolly direction and a zoom direction of the initial background image, and the dolly direction is opposite to the zoom direction;
superimpose an image of the target object onto the target background image based on a position of the target object in the original image, to obtain a target image corresponding to the target frame; and
generate a target video based on the target image corresponding to the target frame,
wherein the processing apparatus is configured to execute the computer program stored in the storage apparatus to:
determine a perspective point of the initial background image;
determine the dolly direction, a dolly distance, the zoom direction and a zoom distance of the initial background image, based on an initial position of the identified target object in the original image and a desired position of the target object in a picture;
perform a picture dolly on the initial background image in the dolly direction at a sliding distance with the perspective point as a center; and
perform a picture zoom on the initial background image in the zoom direction at the zoom distance with the perspective point as the center.

11. The electronic device according to claim 10, wherein the computer program, when executed by the processing apparatus, causes the processing apparatus to:
identify the target object in the original image by a pre-trained target object identification model; or
identify the target object in the original image through historical position information corresponding to the target object, wherein the historical position information is obtained by performing motion tracking on an image prior to the original image.

12. The electronic device according to claim 10, wherein the computer program, when executed by the processing apparatus, causes the processing apparatus to:
determine a center point of the original image as the perspective point; or
acquire depth information of the original image; determine a vanishing point position in the original image based on the depth information; and take the vanishing point position as the perspective point.

13. The electronic device according to claim 10, wherein the computer program, when executed by the processing apparatus, causes the processing apparatus to:
determine first coordinates of the initial position in a three-dimensional image space corresponding to the original image;
determine second coordinates of the desired position in the three-dimensional image space;

determine the dolly direction, the dolly distance, the zoom direction and the zoom distance based on the first coordinates and the second coordinates.

14. The electronic device according to claim 10, wherein the computer program, when executed by the processing apparatus, causes the processing apparatus to:
process the original image in a case that the position of the target object in the original image does not match the desired position of the target object in the picture, to match the position of the target object in the processed image with the desired position, and
record a position of the target object in a processed image as the initial position.

15. The electronic device according to claim 10, wherein the computer program, when executed by the processing apparatus, causes the processing apparatus to:
remove the target object from the original image to obtain a first background image;
acquire a second background image located at an area covered by the target object in the original image;
supplement the second background image into the first background image based on a position of the area covered by the target object, to obtain the initial background image.

16. The electronic device according to claim 15, wherein the computer program, when executed by the processing apparatus, causes the processing apparatus to:
obtain the second background image from a preset background supplement image; or
extract partial image from the first background image, and take the extracted image as the second background image; or
perform image inpainting on a missing part of the first background image, and take an image after the image inpainting as the second background image.

17. The electronic device according to claim 10, wherein the computer program, when executed by the processing apparatus, causes the processing apparatus to:
acquire the original image corresponding to the target frame from a media file to be processed, wherein the media file to be processed is an image or video containing the target object; or
acquire the original image corresponding to the target frame, from an information stream collected in real time by an image collection apparatus.

* * * * *